(12) United States Patent  
Roelleke

(10) Patent No.: US 7,206,680 B2
(45) Date of Patent: Apr. 17, 2007

(54) METHOD FOR DETERMINING A DECISION FOR THE TRIGGERING OF RESTRAINT MEANS IN A VEHICLE

(75) Inventor: Michael Roelleke, Leonberg-Hoefingen (DE)

(73) Assignee: Robert Bosch GmbH, Stuttgart (DE)

( * ) Notice: Subject to any disclaimer, the term of this patent is extended or adjusted under 35 U.S.C. 154(b) by 75 days.

(21) Appl. No.: 10/433,348

(22) PCT Filed: Sep. 11, 2002

(86) PCT No.: PCT/DE02/03378

§ 371 (c)(1),
(2), (4) Date: Nov. 5, 2003

(87) PCT Pub. No.: WO03/031236

PCT Pub. Date: Apr. 17, 2003

(65) Prior Publication Data

US 2004/0073346 A1    Apr. 15, 2004

(30) Foreign Application Priority Data

Oct. 5, 2001 (DE) .............................. 101 49 112

(51) Int. Cl.
*G06F 7/00* (2006.01)
*B60R 21/16* (2006.01)

(52) U.S. Cl. .................. 701/45; 701/36; 701/46; 701/47; 340/440; 180/271; 280/734

(58) Field of Classification Search .......... 701/45–47, 701/36–38; 307/9.1, 10.1; 340/425.5, 429, 340/435, 436, 438, 440; 180/271, 282; 280/728.1, 280/734, 735

See application file for complete search history.

(56) References Cited

U.S. PATENT DOCUMENTS

| 6,002,975 | A | * | 12/1999 | Schiffmann et al. | .......... 701/36 |
| 6,658,343 | B1 | * | 12/2003 | Koch et al. | .................. 701/71 |
| 6,671,605 | B2 | * | 12/2003 | Ehret et al. | ................... 701/70 |
| 6,757,605 | B2 | * | 6/2004 | Hartmann | .................... 701/70 |
| 6,873,897 | B2 | * | 3/2005 | Faye et al. | ..................... 701/70 |
| 7,058,486 | B2 | * | 6/2006 | Arndt | ............................. 701/1 |
| 7,136,730 | B2 | * | 11/2006 | Lu et al. | ........................ 701/36 |
| 2004/0128036 | A1 | * | 7/2004 | Arndt | ............................. 701/1 |

FOREIGN PATENT DOCUMENTS

| DE | 197 08 508 | 3/1998 |
| DE | 198 11 865 | 9/1999 |
| DE | 199 10 596 | 9/2000 |
| DE | 199 62 687 | 7/2001 |
| JP | 2001 071844 | 3/2001 |

* cited by examiner

Primary Examiner—Y. Beaulieu
(74) Attorney, Agent, or Firm—Kenyon & Kenyon LLP

(57) ABSTRACT

A method of determining a triggering decision for restraint devices in a vehicle, a triggering decision being determined as a function of a float angle, a vehicle sliding velocity and the vehicle tilt angle. The vehicle tilt angle is characterized here by a vehicle lateral acceleration and/or a vehicle sliding velocity. A passenger detection system may be used in addition.

9 Claims, 2 Drawing Sheets

Fig.4

METHOD FOR DETERMINING A DECISION FOR THE TRIGGERING OF RESTRAINT MEANS IN A VEHICLE

BACKGROUND INFORMATION

The triggering of restraint devices as a function of vehicle dynamics data is already known from German Patent Application No. 199 10 596. Data from an ESP system may be used in particular.

SUMMARY OF THE INVENTION

The method of the present invention of determining a triggering decision for restraint devices in a vehicle has the advantage that it is possible to determine the triggering decision through a simple linking of threshold comparisons for the float angle in combination with the natural vehicle speed in the direction of travel and a vehicle tilt angle. Overall, this results in a timely triggering decision in soil-trip rollover events.

It is especially advantageous that the vehicle tilt movement is characterized by a vehicle lateral acceleration and/or a vehicle sliding velocity, thus making it possible to predict a rollover event by threshold comparisons of these two parameters. The vehicle lateral acceleration is monitored for values that are higher than the forces possible through tire contact with the road. Only starting from these delays is it possible to assume an expected rollover. Typical values for this static friction are in the range up to approximately 1.2 g. At higher accelerations, an external braking action must be assumed, which is accompanied by lateral rolling motions of the vehicle. The typical curves for such events are determined on soft and hard edges by tensile tests on vehicles across the rolling direction.

It is of further advantage that a signal from a passenger detection system determines if a triggering decision is made. It is not necessary to trigger any restraint devices that do not protect a person. Furthermore, a triggering of restraint devices is connected with increased dangers for such persons as children and short or lightweight persons. In this case also, not all restraint devices need be triggered since the triggering of the restraint devices may possibly result in injuries to the persons to be protected.

The float angle here is preferably compared with a threshold value of 30° since a vehicle rollover may occur above this angle. In order to analyze the history or to detect the swerve event, the rotary motion about the vehicle's vertical axis $\omega_z$ and the steering motion are required. As is known, it is possible to calculate the float angle of the vehicle from these two variables. In this connection, an exact calculation is not necessary; even a precision of five degree increments is sufficient. Since swerve events may last up to five or ten seconds, it is important for the swerve function to determine the position of the float angle very robustly.

It is of further advantage that the vehicle lateral acceleration is compared with a threshold value of 1.2 g since as shown above, an external braking action suggesting a rollover must be assumed as of this value. The lateral tilting may result, for example, from the wheels digging in or at an edge.

The vehicle sliding velocity, which is calculated from the vehicle natural speed in the direction of travel using the float angle, is compared with a critical sliding velocity of 5 km/h, as of which the vehicle will tilt on impact with a solid edge. In the case of digging into soil or sand, this speed will be slightly higher since, due to the digging in, the wheels must push up the edge itself. The limit for this critical sliding velocity must be adapted accordingly if necessary.

It is of further advantage that a device is present having appropriate means for determining the float angle and the vehicle tilt movement and also means for determining the triggering decision from the float angle and the vehicle tilt movement.

DETAILED DESCRIPTION

It is generally possible to sense rollover events in motor vehicles using the physical principle of the conversion of rotational energy into potential energy. Using this principle, it is possible to make a prediction of the rollover using a yaw sensor even at relatively small angles of rotation of the vehicle. The typical angles are in the range between 25' and the static tilt angle, i.e., approximately 55°. In specific driving maneuvers known as soil-trip rollover, a lateral movement of the vehicle due to swerve events with subsequent delay caused by, for example, the wheels digging into the soil or the wheels contacting a curb, causes lateral tilting. The occupant movement caused by the lateral delay very rapidly brings about a lateral displacement of the upper body and head until there is an impact with the side window. In this position, it is no longer possible to activate the head protection airbag which deploys down from the roof and is intended to place itself between the side window and the occupant. For the head airbag to activate correctly, detection must take place even before a vehicle tilt angle of 10° is reached.

According to the present invention, therefore, a method is used to determine the triggering time for restraint devices in a vehicle, which as a result of the history of vehicle movement, makes it possible to provide information for predicting the rollover immediately before the rollover. A basis of this is the calculation of the critical sliding velocity (csv) of a vehicle, which indicates the speed from which a vehicle will tilt to the side when the tires experience lateral delay. The lateral delay may result, for example, from the wheels digging in or at an edge.

Figure 1:
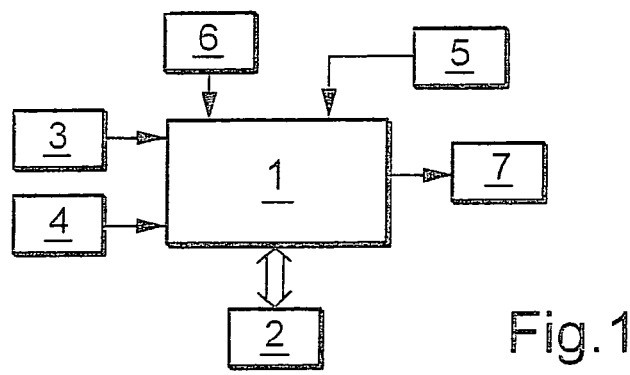
FIG. 1 shows a block diagram of the device according to the present invention.

FIG. 1 shows the device of the present invention in the form of a block diagram. A processor 1, which is located in a control unit for the restraint devices, is connected via a data input/output to a memory 2, in which threshold values are stored which are used for comparison with measured sensor data. Sensor data comes from acceleration sensors 3, yaw sensors 4, an ESP 5 and from a passenger detection system 6. All these sensors are connected to processor 1 by data inputs. Individual sensors 3 to 6 have their own electronics to amplify and digitize the measured values. Acceleration sensors 3 and also yaw sensor 4 may be located in a control unit with processor 1 and memory 2 or they may also be located outside of the control unit.

If sensors are located outside, the connection to processor 1 may be made via two-wire cables or a bus. ESP 5 has its own computer which calculates the data from sensor values.

Acceleration sensors 3 and yaw sensors 4 may also be connected to ESP 5 to deliver sensor input for the ESP calculation. Processor 1 is also connected via a data output to restraint devices 7, i.e., airbags and or seat-belt tightening systems. Restraint devices 7 are triggered as a function of triggering events, only the restraint devices that protect occupants being triggered. This means that unoccupied seats or persons who cannot be protected by airbags receive no protection from triggered restraint devices.

Figure 2:
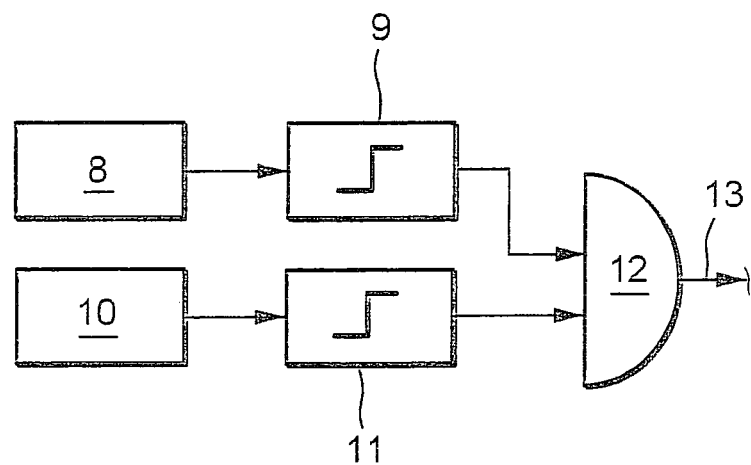
FIG. 2 shows a first block diagram of the method according to the present invention
Figure 5:
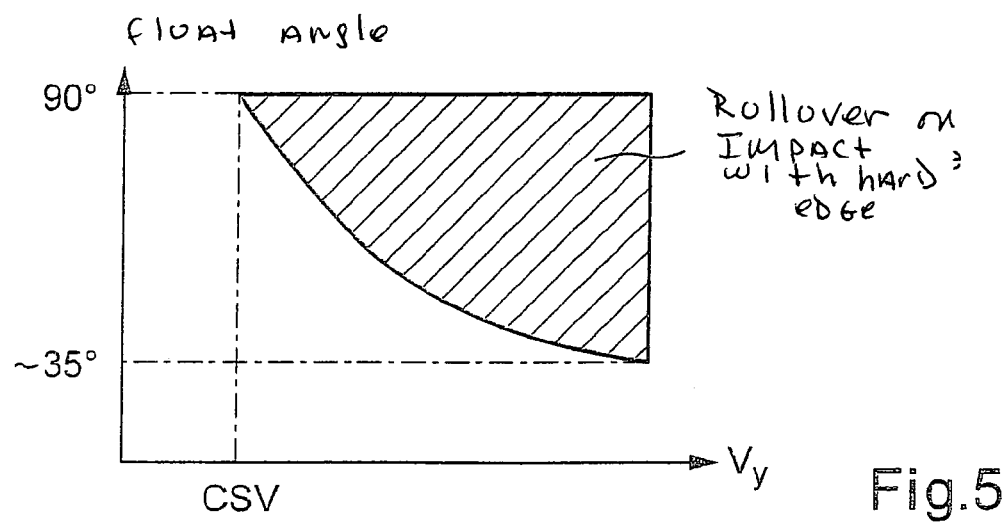
FIG. 5 shows a float angle-sliding velocity diagram, which shows a threshold window.

In the form of a first block diagram, FIG. 2 shows the sequence of the method according to the present invention, which operates in processor 1 on the basis of the sensor values and the stored threshold values. In block 8, the yaw rates about the vehicle's vertical axis and the steering motions supplied by ESP 5 are used to calculate the float angle, which specifies the angle between the direction of travel of the vehicle, i.e., the speed vector, and the vehicle longitudinal axis. This float angle is linked to the vehicle natural speed in the direction of travel $v_x$ in order to estimate transverse component $v_y$ ($v_y = v_x$ cos (float angle)). This transverse component $v_y$ is combined with the float angle and compared using a threshold window $f(v_y, \text{float angle})$. If the threshold is exceeded, then a rollover on impact against an edge is unavoidable. This is shown in FIG. 5. There the sliding velocity is plotted on the X-axis and the amount of the float angle on the Y-axis. The gray shaded area identifies the area in which a rollover is unavoidable on impact of the side of the vehicle against a hard edge. It starts at a float angle of approximately 35° and with decreasing speed, reaches a float angle of 90°. Therefore, the shaded area results in a logical one.

Accordingly in block 9, this float angle and the sliding velocity are subjected to a threshold value decision according to FIG. 5. The output of block 9 leads to a first input of an AND gate 12. In block 10, the tilt angle of the vehicle is calculated. The tilt angle is also subjected to a threshold value comparison in block 11, a tilt angle of 5° being used as a threshold value here. If the tilt angle is above the threshold value, then a logical one is also present at the output of block 11. The output of block 11 leads to a second input of AND gate 12. Thus the output signals of blocks 9 and 11 are subjected to a logical AND operation so that only one logical one is then present at output 13 of AND gate 12 if both threshold comparators 9 and 11 indicate that the threshold value has been exceeded.

Figure 3:
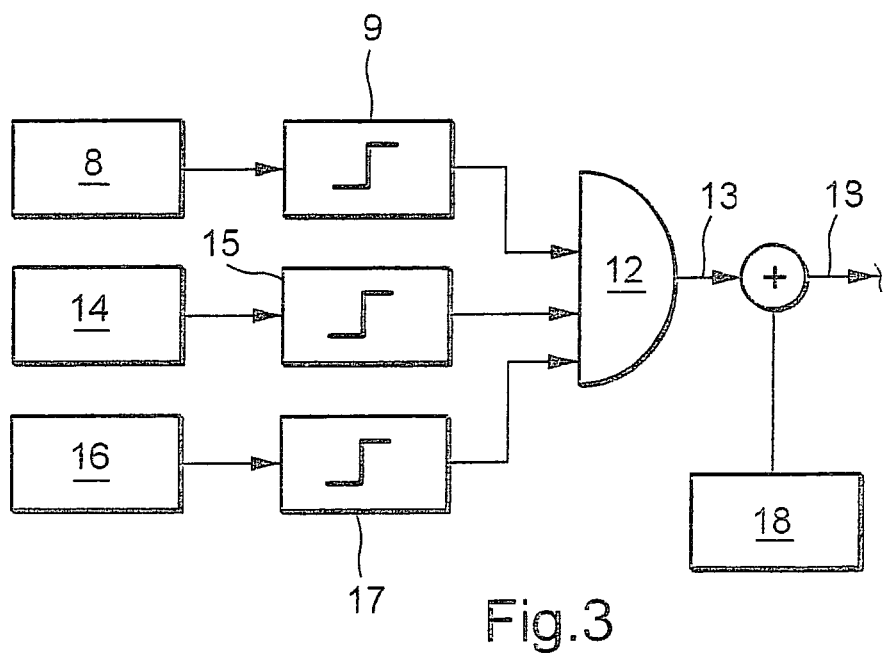
FIG. 3 shows a second block diagram of the method according to the present invention.

FIG. 3 shows a second block diagram of the method according to the present invention. That which was stated above applies to blocks 8 and 9. The tilt angle is now indicated indirectly using two parameters by subjecting both of these parameters to a separate threshold value comparison. In block 14, the lateral acceleration, i.e., in the vehicle transverse direction, is supplied by acceleration sensor 3. Processor 1 then performs a comparison for this lateral acceleration in threshold comparator 15. The threshold value is specified here at 1.2 G and only if the lateral acceleration exceeds this threshold value is a logical one present at the output of threshold comparator 15. In block 16, the sliding velocity of the vehicle determined during the tilt event is supplied by processor 1. This vehicle sliding velocity may be determined either from acceleration signals or using a speed sensor. This velocity is then also subjected to a threshold value comparison in block 17. If this velocity is above a critical velocity, which is specified here at 5 km/h, then a logical one is present at the output of threshold comparator 17. The outputs of threshold comparators 9, 15 and 17 are the inputs of AND gate 12. Only if all threshold comparators indicate a logical one, i.e., if all threshold values are exceeded by the measured values, is a logical one then present at output 13 of AND gate 12. This logical one then continues to be AND-linked with a signal from passenger detection system 6, which is supplied in block 18. If this signal indicates that only specific seats are occupied, then restraint devices 7 are only triggered for those seats. This is then present as a signal at output 19.

Figure 4:
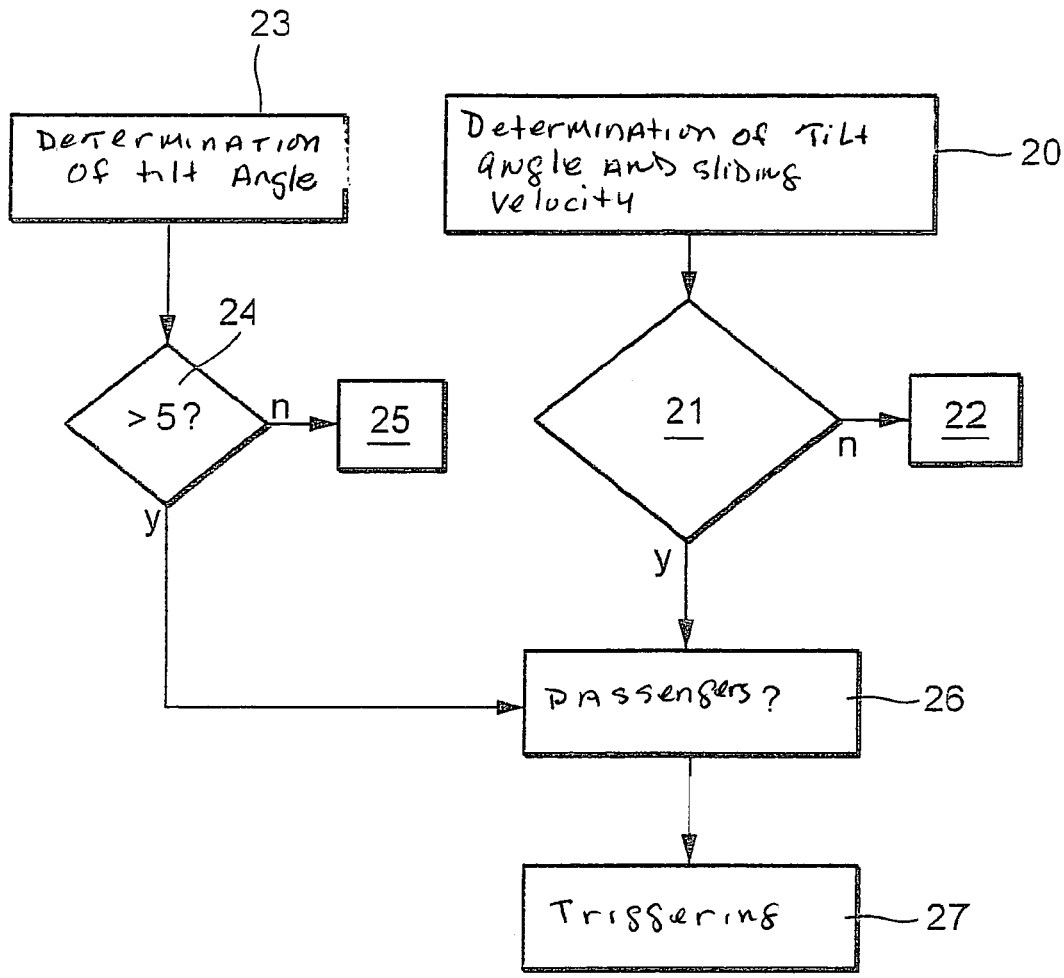
FIG. 4 shows a flow chart of the method according to the present invention.

A flow chart of the method of the present invention for determining a triggering time for restraint devices in a vehicle is shown in FIG. 4. In step 20, the float angle and the sliding velocity are determined as specified above. In step 21, this pair of values is compared with the threshold value of FIG. 5. If the pair of values is under this threshold value, then this process is ended at step 22. If, however, the pair of values is above this threshold value, the process skips to step 26. In step 23, the tilt angle is determined as described above using, for example, the lateral acceleration. In step 24, this tilt angle is compared with a threshold value. If the tilt value is below this threshold value, then the process is ended at step 25. If, however, the tilt angle is above this threshold value, then the process also skips to step 26. Only if both conditions are met is a check made in step 26 of which passengers are present in the vehicle and thus are to be protected with restraint devices. In step 27, the corresponding restraint devices 7 are triggered for the passengers who are present.

What is claimed is:

1. A method for determining a triggering decision for at least one restraint device in a vehicle, the method comprising the step of:

determining the triggering decision as a function of driving dynamics data, the driving dynamics data including a float angle in combination with a sliding velocity of the vehicle, the float angle being determined as a function of a yaw rate and a steering motion, and a vehicle tilt movement, the determining step including the sub-steps of comparing the driving dynamics data in each case with at least one threshold value and making the triggering decision as a function of the comparisons.

2. The method according to claim 1, further comprising the step of determining the vehicle tilt movement by a vehicle lateral acceleration and by a vehicle sliding velocity.

3. The method according to claim 1, wherein the triggering decision is determined as a further function of a signal from a passenger detection system.

4. The method according to claim 1, further comprising the step of determining the float angle in five degree increments.

5. The method according to claim 2, further comprising the step of comparing the vehicle lateral acceleration with a threshold value of 1.2 G.

6. The method according to claim 2, further comprising the step of comparing the vehicle sliding velocity with a threshold value of 5 km/h.

7. A device comprising:

means for determining a float angle, a sliding velocity of a vehicle and a tilt movement of the vehicle, the float angle being determined as a function of a yaw rate and a steering motion; and means for determining a triggering decision for a restraint device in the vehicle as a function of the float angle, the vehicle sliding velocity and the vehicle tilt movement.

8. A method according to claim 1, wherein the sliding velocity is a function of the float angle and a vehicle speed.

9. A device according to claim 7, wherein the sliding velocity is a function of the float angle and a vehicle speed.

* * * * *